(12) United States Patent
Williams et al.

(10) Patent No.: US 11,445,052 B2
(45) Date of Patent: Sep. 13, 2022

(54) SYSTEM AND METHOD FOR ACHIEVING ACCELERATED THROUGHPUT

(71) Applicant: LiveQoS Inc., Ottawa (CA)

(72) Inventors: Matthew Robert Williams, Kanata (CA); Mohan Krishna Vemulapali, Nepean (CA)

(73) Assignee: Adaptiv Networks Inc., Gatineau (CA)

(*) Notice: Subject to any disclaimer, the term of this patent is extended or adjusted under 35 U.S.C. 154(b) by 0 days.

(21) Appl. No.: 14/821,718

(22) Filed: Aug. 8, 2015

(65) Prior Publication Data

US 2015/0350390 A1 Dec. 3, 2015

Related U.S. Application Data

(60) Division of application No. 13/097,991, filed on Apr. 29, 2011, which is a division of application No.
(Continued)

(51) Int. Cl.
*H04L 69/325* (2022.01)
*H04L 43/0888* (2022.01)
(Continued)

(52) U.S. Cl.
CPC .......... *H04L 69/325* (2013.01); *H04L 1/0007* (2013.01); *H04L 1/0041* (2013.01);
(Continued)

(58) Field of Classification Search
CPC ... H04L 69/325; H04L 1/0007; H04L 1/0041; H04L 1/0068; H04L 1/0071;
(Continued)

(56) References Cited

U.S. PATENT DOCUMENTS

| 4,908,827 A | 3/1990 | Gates |
| 5,600,663 A | 2/1997 | Ayanoglu et al. |

(Continued)

FOREIGN PATENT DOCUMENTS

| CA | 2450563 | 12/2002 |
| EP | 1049299 | 11/2000 |

(Continued)

OTHER PUBLICATIONS

International Search Report, PCT/IB2012/050473, dated Aug. 24, 2012 (3 pages).

(Continued)

*Primary Examiner* — Mandish K Randhawa
(74) *Attorney, Agent, or Firm* — Stratford Group Ltd.

(57) ABSTRACT

Systems and methods for transporting data between two endpoints over an encoded channel are disclosed. Data transmission units (data units) from the source network are received at an encoding component logically located between the endpoints. These first data units are subdivided into second data units and are transmitted to the destination network over the transport network. Also transmitted are encoded or extra second data units that allow the original first data units to be recreated even if some of the second data units are lost. These encoded second data units may be merely copies of the second data units transmitted, parity second data units, or second data units which have been encoded using erasure correcting coding. At the receiving endpoint, the second data units are received and are used to recreate the original first data units.

10 Claims, 11 Drawing Sheets

Related U.S. Application Data

12/718,650, filed on Mar. 5, 2010, now Pat. No. 7,953,114, which is a continuation-in-part of application No. 12/193,345, filed on Aug. 18, 2008, now Pat. No. 8,009,696, which is a continuation-in-part of application No. 10/912,200, filed on Aug. 4, 2004, now Pat. No. 7,742,501.

(51) Int. Cl.
  *H04L 43/0829* (2022.01)
  *H04L 1/00* (2006.01)
  *H04L 1/08* (2006.01)
  *H04L 1/18* (2006.01)

(52) U.S. Cl.
  CPC .......... *H04L 1/0068* (2013.01); *H04L 1/0071* (2013.01); *H04L 1/0072* (2013.01); *H04L 1/08* (2013.01); *H04L 43/0835* (2013.01); *H04L 43/0888* (2013.01); *H04L 1/0057* (2013.01); *H04L 1/1809* (2013.01); *H04L 1/1812* (2013.01); *H04L 2001/0097* (2013.01)

(58) Field of Classification Search
  CPC ..... H04L 1/0072; H04L 1/08; H04L 43/0835; H04L 43/0888; H04L 1/0057; H04L 1/1809; H04L 1/1812; H04L 2001/0097
  See application file for complete search history.

(56) References Cited

U.S. PATENT DOCUMENTS

| | | | |
|---|---|---|---|
| 5,751,970 A | 5/1998 | Bournas | |
| 5,857,072 A | 1/1999 | Crowle | |
| 6,000,053 A | 12/1999 | Levine et al. | |
| 6,012,159 A | 1/2000 | Fischer et al. | |
| 6,126,310 A | 10/2000 | Osthoff et al. | |
| 6,172,972 B1 | 1/2001 | Birdwell et al. | |
| 6,188,674 B1* | 2/2001 | Chen ................ | H04L 43/0835 370/252 |
| 6,272,148 B1 | 8/2001 | Takagi et al. | |
| 6,272,658 B1 | 8/2001 | Steele et al. | |
| 6,278,716 B1 | 8/2001 | Rubenstein et al. | |
| 6,336,200 B1 | 1/2002 | Wolfgang | |
| 6,421,387 B1 | 7/2002 | Rhee | |
| 6,421,805 B1 | 7/2002 | McAuliffe | |
| 6,438,108 B1 | 8/2002 | Kanljung et al. | |
| 6,445,717 B1* | 9/2002 | Gibson .............. | H03M 13/373 370/473 |
| 6,449,251 B1 | 9/2002 | Awadallah | |
| 6,529,552 B1 | 3/2003 | Tsai | |
| 6,570,843 B1 | 5/2003 | Wofgang | |
| 6,606,723 B2 | 8/2003 | Wolgang | |
| 6,609,223 B1 | 8/2003 | Wolfgang | |
| 6,728,924 B1 | 4/2004 | Lou et al. | |
| 6,744,766 B2 | 6/2004 | Alapuranen | |
| 6,868,083 B2 | 3/2005 | Apostolopoulos et al. | |
| 6,876,669 B2 | 4/2005 | Shalom | |
| 6,901,051 B1 | 5/2005 | Hou | |
| 7,016,409 B2 | 3/2006 | Unger | |
| 7,024,609 B2 | 4/2006 | Wolfgang et al. | |
| 7,035,217 B1 | 4/2006 | Vicisano | |
| 7,050,396 B1 | 5/2006 | Cohen | |
| 7,089,478 B2 | 6/2006 | Cummings et al. | |
| 7,075,936 B2 | 7/2006 | Hathaway | |
| 7,133,407 B2 | 11/2006 | Jinzaki et al. | |
| 7,167,704 B2 | 1/2007 | Chang | |
| 7,215,683 B2 | 5/2007 | Burkert et al. | |
| 7,310,670 B1 | 12/2007 | Walbeck et al. | |
| 7,319,701 B2 | 1/2008 | Guven | |
| 7,609,716 B2 | 10/2009 | Brown | |
| 7,720,063 B2 | 5/2010 | Maiorana | |
| 7,739,398 B1 | 6/2010 | Shabtay | |
| 7,742,501 B2 | 6/2010 | Williams | |
| 7,801,044 B2 | 9/2010 | Moutarlier | |
| 7,821,937 B1 | 10/2010 | Guo | |
| 7,889,654 B2 | 2/2011 | Ramakrishnan et al. | |
| 7,936,785 B2 | 5/2011 | Ehret et al. | |
| 7,953,114 B2 | 5/2011 | Williams et al. | |
| 8,009,696 B2 | 8/2011 | Williams et al. | |
| 8,045,563 B2 | 10/2011 | Lee | |
| 8,437,370 B2 | 5/2013 | Williams et al. | |
| 2001/0009547 A1 | 7/2001 | Jinzaki | |
| 2001/0040883 A1 | 11/2001 | Chang et al. | |
| 2002/0061059 A1 | 5/2002 | Ginesi | |
| 2002/0141448 A1 | 10/2002 | Matsunaga | |
| 2002/0146016 A1 | 10/2002 | Liu et al. | |
| 2002/0164024 A1 | 11/2002 | Arakawa | |
| 2003/0002499 A1* | 1/2003 | Cummings .......... | H04L 1/1877 370/389 |
| 2003/0018793 A1 | 1/2003 | Mora | |
| 2003/0035440 A1 | 2/2003 | Casaccia | |
| 2003/0105997 A1 | 6/2003 | Mitlin | |
| 2003/0108044 A1 | 6/2003 | Hendel | |
| 2003/0152058 A1 | 8/2003 | Cimini, Jr. | |
| 2003/0219034 A1 | 11/2003 | Lotter | |
| 2004/0010736 A1 | 1/2004 | Alapuranin | |
| 2004/0039827 A1 | 2/2004 | Thomas | |
| 2004/0095885 A1* | 5/2004 | Yang ................ | H04L 12/5693 370/235.1 |
| 2004/0196785 A1 | 10/2004 | Janakiraman | |
| 2004/0213197 A1 | 10/2004 | Zimmerman | |
| 2004/0267945 A1 | 12/2004 | Reiss | |
| 2005/0053002 A1 | 3/2005 | Chan | |
| 2005/0130646 A1 | 6/2005 | Frank | |
| 2005/0195859 A1 | 9/2005 | Mahany | |
| 2005/0213586 A1 | 9/2005 | Cyganski | |
| 2005/0228651 A1* | 10/2005 | Wang ................ | G10L 19/08 704/207 |
| 2006/0018315 A1 | 1/2006 | Baratakke | |
| 2006/0029101 A1 | 2/2006 | Williams | |
| 2006/0031518 A1 | 2/2006 | Jennings | |
| 2006/0031847 A1 | 2/2006 | Macdonald | |
| 2006/0178143 A1 | 8/2006 | Chang | |
| 2006/0210037 A1 | 9/2006 | Olafsson | |
| 2007/0011321 A1 | 1/2007 | Huntington et al. | |
| 2007/0076680 A1 | 4/2007 | Amram | |
| 2007/0116052 A1 | 5/2007 | Yanbin | |
| 2007/0157060 A1 | 7/2007 | Ganga | |
| 2008/0089268 A1 | 4/2008 | Kinder | |
| 2008/0095247 A1 | 4/2008 | Ohno | |
| 2008/0134005 A1* | 6/2008 | Izzat ................ | H04L 1/0009 714/774 |
| 2008/0151776 A1* | 6/2008 | Kure ................ | H04L 1/0007 370/253 |
| 2008/0151823 A1 | 6/2008 | Quigley | |
| 2008/0240108 A1 | 10/2008 | Hyldgaard | |
| 2008/0304483 A1 | 12/2008 | Williams et al. | |
| 2009/0006920 A1 | 1/2009 | Munson | |
| 2009/0049189 A1 | 2/2009 | Zhu | |
| 2009/0116487 A1 | 5/2009 | Read | |
| 2009/0135950 A1 | 5/2009 | Hoffman | |
| 2010/0005177 A1 | 1/2010 | Cagenius | |
| 2010/0009547 A1 | 1/2010 | Sakamoto | |
| 2010/0023711 A1* | 1/2010 | Thyagarajan ........ | H04L 1/0071 711/157 |
| 2010/0023842 A1 | 1/2010 | Rahrer et al. | |
| 2010/0080167 A1 | 4/2010 | Cordeiro | |
| 2010/0272122 A1 | 10/2010 | Williams et al. | |
| 2011/0044338 A1 | 2/2011 | Stahl | |
| 2011/0103388 A1 | 5/2011 | Williams et al. | |
| 2011/0142034 A1* | 6/2011 | Wu ................ | H04N 21/2343 370/352 |
| 2012/0201136 A1 | 8/2012 | Williams et al. | |
| 2012/0203893 A1 | 8/2012 | Williams et al. | |
| 2012/0213232 A1 | 8/2012 | Williams et al. | |
| 2012/0287806 A1 | 11/2012 | Williams | |
| 2013/0124682 A1 | 5/2013 | Williams | |

FOREIGN PATENT DOCUMENTS

| | | |
|---|---|---|
| EP | 1367748 A2 | 12/2003 |
| EP | 1755248 | 2/2007 |

(56) References Cited

FOREIGN PATENT DOCUMENTS

| JP | 10-119426 | 5/1998 |
|---|---|---|
| JP | 10-174069 | 6/1998 |
| JP | 11-225161 | 8/1999 |
| JP | 2000-151623 | 5/2000 |
| JP | 2001-119426 | 4/2001 |
| JP | 2001-345854 | 12/2001 |
| JP | 2002-077258 | 3/2002 |
| JP | WO 2007/099468 A1 | 10/2002 |
| JP | 2003-196618 | 7/2003 |
| JP | 2003-198618 | 7/2003 |
| JP | 2003-298560 | 10/2003 |
| JP | 2005-287016 | 10/2005 |
| JP | 2008-509580 | 3/2008 |
| JP | 2008-153778 | 7/2008 |
| WO | 98/20511 | 5/1998 |
| WO | 00/48366 | 8/2000 |
| WO | 2009/020876 | 2/2009 |

OTHER PUBLICATIONS

International Written Opinion, PCT/IB2012/050473, dated Aug. 24, 2012 (6 pages).
Notice of Allowance issued in U.S. Appl. No. 10/912,200, dated Mar. 1, 2010 (4 pages).
Pfaffenberger, B. "Central Processing Unit." Webster's New World Computer Dictionary. Ninth Edition. New York: Hungry Minds, Inc., 2001.
Border, J. et al. "Performance Enhancing Proxies Intended to Mitigate Link-Related Degradations." Network Working Group—Category: Informational. Jun. 1, 2001 (46 pages).
Mahy, R. et al. "Traversal Using Relays Around NAT (TURN): Relay Extensions to Session Traversal Utilities for NAT (STUN)." Internet Engineering Task Force (IETF)—Category: Standards Track. Apr. 29, 2010 (68 pages).
Extended European Search Report dated Jun. 26, 2014 which issued in European Patent Application No. 12744550.0 (5 pages).
Extended European Search Report dated May 14, 2014 which issued in European Patent Application No. 14150050.4 (7 pages).
European Search Report dated Sep. 2, 2013 which issued in European Patent Application No. 13177433.3 (5 pages).
Japanese patent Application No. 2007-524146, Office Action dated Sep. 28, 2010.
European Patent Application No. 09167948.0 Search Report dated Nov. 26, 2009.
Barakat, "Simulation-Based Study of link-level Hybrid FEC/ARQ-SR for Wireless Links and Long-Lived TCP Traffic", INRIA Research Report RR-4752, Feb. 2003, 8 pages.
European Patent Application No. 12181248.1 Search Report, dated Sep. 10, 2012 (6 pages).
International Search Report, PCT/IB2011/050917, dated Jun. 22, 2011 (3 pages).
International Written Opinion, PCT/IB2011/050917, dated Jun. 22, 2011 (4 pages).
International Search Report, PCT/CA2005/001206, dated Jun. 22, 2011 (2 pages).
International Written Opinion, PCT/CA2005/001206, dated Jun. 22, 2011 (6 pages).
European Patent Office, Extended European Search Report for Application No. EP 11750276.5 dated Sep. 6, 2017 (9 pages).

* cited by examiner

SYSTEM AND METHOD FOR ACHIEVING ACCELERATED THROUGHPUT

CROSS REFERENCE TO RELATED APPLICATIONS

This application is a divisional of U.S. application Ser. No. 13/097,991, filed Apr. 29, 2011, which is a divisional of U.S. application Ser. No. 12/718,650, filed Mar. 5, 2010, now U.S. Pat. No. 7,953,114, which is a continuation-in-part of U.S. application Ser. No. 12/193,345, filed Aug. 18, 2008, now U.S. Pat. No. 8,009,696, which is a continuation-in-part of U.S. application Ser. No. 10/912,200, filed Aug. 6, 2004, now U.S. Pat. No. 7,742,501, all of which are incorporated herein by reference in their entirety.

FIELD OF THE INVENTION

The present invention relates to communication data networks. More specifically, the present invention relates to systems and methods for increasing the throughput of data transmissions through a transport network as seen from the edge of the transport network.

BACKGROUND OF THE INVENTION

Most, if not all, transport networks are packet based networks that break up data streams into smaller packets of data which are then transmitted from a first source network, or endpoint, to a third destination network, or endpoint, via a second transport network. However, due to congestion and other network limitations, not all packets successfully arrive at the destination network. What matters to the source and end destination networks is the performance of the transport network. The transport network must, from the point of view of the applications at the end networks, ideally be perfect with no lost packets. However, it would be preferred if such performance could be had for a price lower than the usual costs of leasing high performance transport networks.

Accordingly, there is a need for systems and methods, which can be used with low cost communications transport networks to provide end network applications with a high performance view of the transport network.

Approaches have been tried to address the above situation. In one approach, custom protocol stacks are installed at the endpoints to improve the response to loss and latency. However, this approach requires that both end networks communicate according to the same custom protocol, which generally requires extensive reprogramming.

Another approach uses network elements that intercept standard protocols and send protocol responses on behalf of a far-end element. Custom protocols are then used between the intercepting network elements. This approach is limited to TCP/IP applications and adds complexity, especially in regards to troubleshooting network problems.

SUMMARY OF THE INVENTION

In a first aspect, there is provided a method of accelerating data communications over an unreliable network. The method comprises: providing encoding components associated with each of two endpoints to a communication; establishing an encoded channel between the encoding components for a communication session between the endpoints; intercepting a plurality of data packets related to the communication at one of the encoding components; segmenting and packaging each of the plurality of data packets to provide a segmented and packaged data packet having at least one encoded data segment and at least one extra encoded segment for transmission to the other of the encoding components; storing the segmented and packaged data packets at the one of the encoding components; transmitting the segmented and packaged data packets to the other of the encoding components over the encoded channel when a predetermined condition is met; decoding and reassembling the plurality of data packets at the other of the encoding components based on received encoded data segments and received extra encoded segments; and transmitting the reassembled data packets from the other of the encoding components to its respective endpoint.

The predetermined condition can be expiry of a timer, which can, for example, be activated when a respective one of the plurality of data packets is intercepted. The predetermined condition can also be interception of a packet containing real-time sensitive data, or storage of a predetermined number of the segmented and packaged data packets.

The encoded data segments and the at least one extra encoded segment for the plurality of data packets can be interleaved and transmitted in a manner to preserve their ordering. For example, the packaged and segmented data packets can be stored in order and according to their respective sizes, and segments can be transmitted in turn from each packaged and segmented data packet. Alternately, the encoded data segments and the at least one extra encoded segment for each of the plurality of data packets are transmitted in random order.

The method can further comprise determining that one of the encoded data segments is lost if it has not been received at the other of the encoding components within a predetermined period, such as upon expiry of a timer set when a first encoded data segment for a given data packet is received, or by reference to a ring buffer. In the latter case, the ring buffer can track sequence numbers of missing encoded data segments, and determine that a given encoded data segment is lost when the ring buffer cycles back to a sequence number of the given encoded data segment. The method can further comprise interleaving encoded data segments from the plurality of data packets when it is determined that a predetermined number of encoded data segments from a given segmented and packaged data packet have been lost.

Segmenting and packaging a data packet can comprise segmenting and packaging the data packet into n encoded data segments, where n>1. In this case, n can be dynamically adjusted based on size of the data packet; for example, n can be selected such that size of encoded data segments does not exceed a predetermined maximum transfer unit size.

In a further aspect, there is provided a method of accelerating data communications over an unreliable network. The method comprises establishing an encoded channel between first and second encoding components for a communication session between two endpoints by: detecting, at the first encoding component, a message originating from a first of the two endpoints and destined to the other of the two endpoints, creating a marked message destined to the other endpoint with a mark to indicate that the first endpoint is enabled to segment and encode data packets according to a protocol known to both encoding components, wherein the mark is selected from a plurality of available marks, forwarding the marked message to the other endpoint, receiving a reply to the marked message from the second encoding component, and exchanging control messages to establish a communication channel between the encoding components; intercepting a data packet related to the communication at one of the first and second encoding components; segmenting and packaging the data packet to provide encoded data segments for transmission to the other of the first and second encoding components; transmitting the encoded data segments and at least one extra encoded segment to the other of the first and second encoding components over the encoded channel; decoding and reassembling the data packet at the other of the first and second encoding components based on the received encoded data segments; and transmitting the reassembled data packet from the other of the first and second encoding components to its respective endpoint.

According to this aspect, establishing the encoded channel can further comprise storing information uniquely identifying the communication session. An identification of the mark for use in subsequent communication sessions between the encoding components can be stored. If no reply is received within a predetermined time, a further marked message can be created by selecting a further mark from the plurality of available marks. If no reply is received for any of the plurality of available marks, a network manager is advised that the second endpoint is not enabled for accelerated communication with the first endpoint.

The method can further comprise entering a tear down state if no encoded data packets are transmitted within a predetermined timeout period. During the tear down state, newly received data packets are not segmented and packaged. The encoding components can further transmit keep alive messages during periods of inactivity. One of the endpoints can also be designated as a master endpoint, and the method can further comprise the master endpoint determining if tear down of the encoded channel is indicated. For example, the master endpoint can determine that tear down is indicated if no new data packets are received within a predetermined period.

The first and second encoding components can have precedence over other encoding components. If they have precedence, the method can further comprise receiving, at the first encoding component, a marked packet from an encoding component other than the first and second encoding components; asserting precedence by: removing marking from the marked packet; and establishing the encoded channel between the first and second encoding components. The first and second encoding components can also be configured to ignore marked packets received from specified encoding components, and to transmit the marked packets transparently.

In a further aspect, there is provided a method of setting an encoding rate for encoding data for accelerated data communication across an unreliable network between two endpoints each respectively associated with an encoding component; comprising: establishing an encoded channel between the encoding components for a communication session between the endpoints; intercepting a data packet related to the communication at one of the encoding components; segmenting and packaging the data packet to provide encoded data segments for transmission to the other of the encoding components; transmitting the encoded data segments and at least one extra encoded segment to the other of the encoding components over the encoded channel; decoding and reassembling the data packet at the other of the encoding components based on the received encoded data segments; transmitting the reassembled data packet from the other of the encoding components to its respective endpoint; computing a weighted loss ratio for the communication session; and adjusting the encoding rate based on the weighted loss ratio. Computing the weighted ratio can, for example, comprise computing the weighted ratio in accordance with average loss ratios of previous communication sessions, or in accordance with retransmission requests.

The method can further comprise computing a current loss level in accordance with the weighted loss ratio. The weighted loss ratio can also be normalized. The current loss level can be communicated to the other of the encoding components, such as over a control channel, or in a header portion of one of the encoded data segments. The header portion can further identify a desired level of protection, which can be determined in accordance with loss objectives configured according to a network policy.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
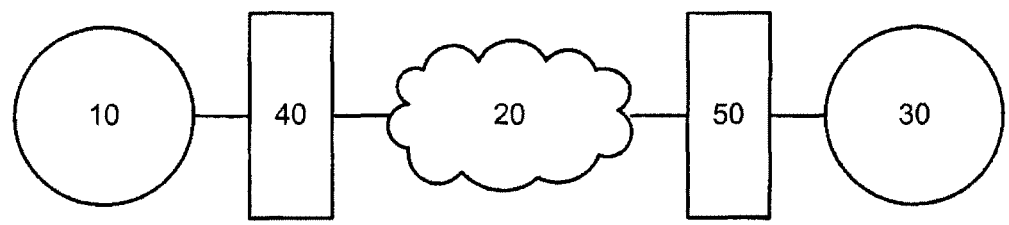
FIG. 1 is a block diagram of an environment in which the invention may be practiced.

Referring to FIG. 1, a block diagram of an environment in which the invention may be practiced is illustrated. A first endpoint 10 communicates, through a network 20, with a second endpoint 30. The first endpoint 10 and the network 20 communicate through an encoding/decoding component 40, while the network 20 communicates with the second endpoint 30 through an encoding/decoding component 50. The encoding/decoding components 40 and 50, hereafter referred to as encoding components, can be resident at the endpoints, or in an intermediate device, such as a server. The first and second endpoints 10 and 30 can be terminals, such as personal computers connected through a modem, local or wide-area networks, or other devices or systems having access to the network 20. The network 20 can be, for example, the Internet or other communications network.

As used herein, a data unit is any unit of data that can be used to transmit data digitally over a network. Such data units can take the form of packets, cells, frames, or any other such units, provided the data is encapsulated within the unit, or carried as a payload. The term data unit is applicable to any and all packets and frames that implement specific protocols, standards, or transmission schemes. Typically, a header, carrying routing, control and identification information, is added to the data payload.

The present system provides a means for insulating the endpoints from the vagaries of the network 20. The encoding components 40 and 50 are provided with means to insulate the endpoints 10 and 30 from the network 20 by handling the encoding and decoding of data units, and their transmission through the network 20. The endpoints 10 and 30 can communicate using any protocol, as can the encoding components 40 and 50. The encoding components 40 and 50 receive original data units in one protocol from the endpoints 10 and 30, and encode the original data units by subdividing them into preferably smaller data units, creating extra data units that can be used to recreate or reconstruct the original data units in the event that some of the data units transmitted through the transport network are lost, and repackaging the subdivided and extra data units according to the present protocol prior to transmitting them through the transport network.

Once the data units transmitted through the transport network 20 are received at the encoding component associated with the far endpoint, the original data units from the originating endpoint are recreated or reconstructed. This recreation or reconstruction can be done by reordering the received data units, if necessary, and, if some data units were lost during transmission, using the extra data units to recreate missing data units. In the event the extra data units received are insufficient to recreate the original data units, the receiving encoding component can optionally request a re-transmission of the data units previously sent.

For ease of explanation, data units originating from or received at the endpoints will be referred to as first data units, or packets, and as being of a first type of data unit. Data units being transmitted across and/or received from the transport network will be referred to as second data units, or segments and as being of a second type of data unit. The second data units are also referred to as encoded data units.

Figure 2:
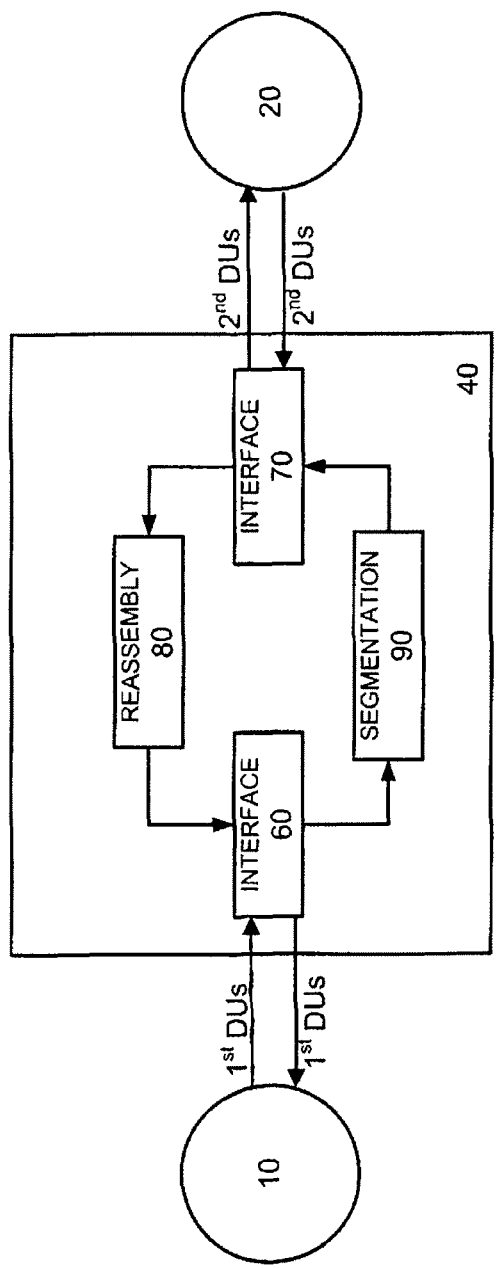
FIG. 2 is a block diagram illustrating the components in a server used in FIG. 1.

FIG. 2 shows an exemplary embodiment of modules necessary to implement the present invention within encoding component 40, and their respective data flows. The modules can be resident in a single device, or can be distributed amongst several devices. As can be seen, encoding component 40 has a first interface 60, a second interface 70, a reassembly module 80, and a segmentation module 90. The first interface 60 sends and receives first data units to and from an endpoint 10. The second interface 70 of the server 40 sends and receives second data units to and from the transport network 20.

The reassembly module 80 receives second data units from the second interface 70 and produces first data units for transmission to the first network 10 by way of the first interface 60. The segmentation module 90, on the other hand, receives first data units from the first interface 60 and produces second data units for transmission to the transport network 20 by way of the second interface 70.

Figure 3:
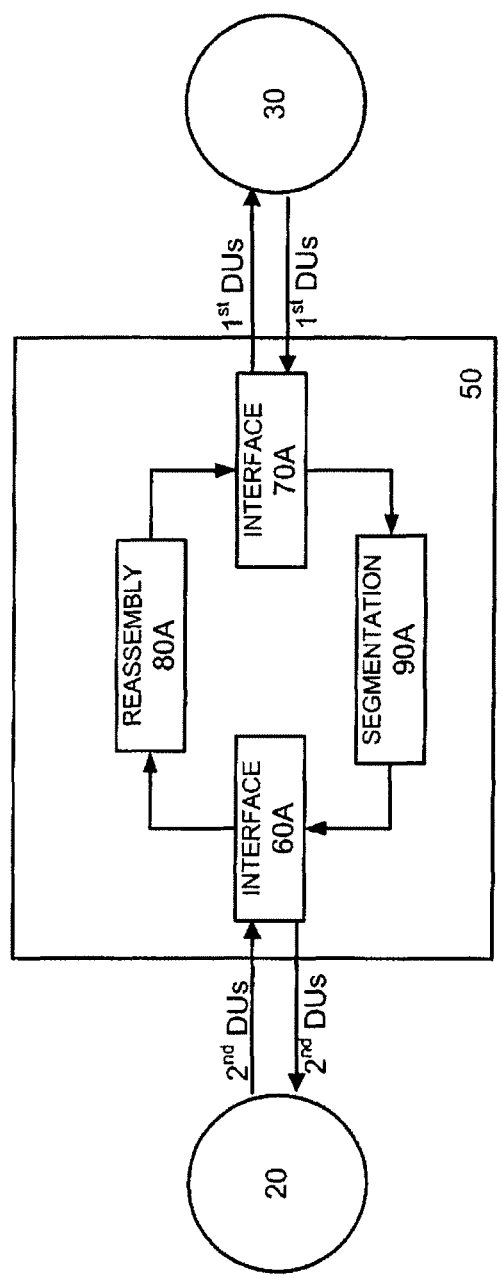
FIG. 3 is a block diagram illustrating the components in another server used in FIG. 1.

Once the second data units have been transmitted through the transport network, they are received by the encoding component at the other endpoint. To illustrate this, FIG. 3 illustrates an exemplary embodiment of the modules and data flow of encoding component 50, which communicates with the transport network and endpoint 30.

The modules in the encoding component 50 are the same as those in encoding component 40 and, in fact, have the same functions. The second interface 70A in encoding component 50 also communicates with the transport network and sends and receives second data units. The first interface 60A also communicates with an endpoint (in this case the endpoint 30) and sends and receives first data units. The reassembly module 80A receives second data units and produces first data units while the segmentation module 90A receives first data units and produces second data units.

As noted above, first data units are the data units used by the end networks, while second data units are used by the transport network and the encoding components 40, 50 when transmitting data to and from each other. The second data units are derived from the first data units. The payload of the first data units can be divided into smaller units and each smaller unit can be the payload in a second data unit. As such, each second data unit can be smaller than the original first data unit from which it was derived. As an example, a 10 kB first data unit may be subdivided into five 2 kB units. These may be the payload of five second data units, each of which may be smaller than 10 kB. This function of creating second data units from first data units is accomplished by the segmentation modules 90, 90A.

To assist in recreating the original first data unit from which the second data units were derived from, the segmentation module also creates extra second data units. These extra second data units can be derived from the first and second data units. The extra second data units assist the reassembly modules 80, 80A in recreating or reassembling the original first data unit in the event one or more second data units are lost during their transmission through the transport network.

The extra second data units can take many forms. In perhaps the simplest embodiment, the extra second data units are merely copies of selected second data units previously sent. As an example, if a first data unit is divided or segmented into four second data units (e.g. DU1, DU2, DU3, DU4), then the extra second data units could be copies of DU2 and DU3. As such, if DU2 or DU3 are lost during the transmission, then the original first data unit can still be recreated. The number and identification of the second data units that are duplicated can be predetermined, or left to the discretion of the system administrator. More redundancy can be built in to the system by including more duplicate second data units, or vice versa for less redundancy, depending on the actual or expected degree of loss in the network 20. In the simplest case, all the second data units can be duplicated to ensure that, in essence, two copies of each second data unit are sent to the destination encoding component.

Parity data units can also be used as the second extra data units. As is well known in the art, a parity data unit can be created using the XOR function. The bits of the different second data units created from the original first data unit can be XOR'd to result in bit values which can be stored in an extra second data unit. If any one of the second data units (not including the extra second data unit) is lost during transmission, the other received second data units and the extra second data unit can be used to recreate the lost second data unit. Performing an XOR function on the received second data units and the extra second data unit will recreate the missing second data unit.

It should be noted that the extra second data units may be encoded using other erasure correcting codes. As an example, if n second data units are generated for a single first data unit, m extra second data units may be generated to allow the lost second data units to be recreated. As noted above, the m extra second data units may be viewed as "redundant" second data units and, if mere duplication is used, m≤n with complete duplication being achieved at m=n. However, if erasure correcting codes are used, with m=2, it is possible to encode the redundant information in such a way that any two second data units can be lost and the reassembly modules can still reconstruct the lost second data units. Well-known methods and coding techniques such as Reed-Solomon, Forward Erasure Correction techniques, and Bose-Chaudhuri-Hochquenghem (BCH) codes, and a multitude of others may be used.

While the extra second data units should assist in counteracting the effects of losing some second data units, losing too many second data units cannot be completely compensated for. As such, losing a number of second data units past a threshold level can optionally cause the reassembly modules to request a re-transmission of a package or group of second data units. As an example, if the extra second data units can recover from a 25% loss of data units and there are four second data units generated from a single first data unit, then the loss of a single second data unit would not trigger a re-transmission request. However, with the loss of two second data units (i.e. a 50% loss) the reassembly module could request a re-transmission. If re-transmission is enabled, the re-transmission threshold is ideally related to the error or loss-correcting capability of the coding used for the extra or redundant second data units. The reassembly modules can keep track of the number of second data units received for each first data unit that has been segmented, as the reassembly modules will need to properly sequence the payloads of the second data units.

As can be noted from the above, the reassembly modules 80 and 80A decode and reassemble the second data units received to form the original first data units. The second and extra second data units received are tracked to determine if a sufficient number have been received to recreate the original first data unit. If a sufficient number have not been received, retransmission can optionally be requested. If some second data units have been lost, then the reassembly modules can recreate or reconstruct the missing second data units. As noted above, this process depends upon the coding used and the overall strategy employed. Such decoding and error correction processes are well known to those versed in this art.

Once the required number of second data units has been received, their payloads are extracted and used to reconstruct the original first data unit from which the second data units were derived. This may be as simple as concatenating the payloads of the second data units to result in the reconstructed first data unit. However, as noted above regarding the decoding, the reconstruction process will depend upon the process used to segment or divide the original first data unit. Once the original first data unit is reconstructed, it can be forwarded to the appropriate Interface communicating with the receiving endpoint.

Regarding the segmentation modules, these modules perform the task of segmenting or dividing the first data units and "repackaging" the segments into second data units. The segmentation modules also encode the extra second data units as discussed above. The second data units, both those derived from the first data unit and the extra second data units, are then passed on to the interface module, which communicates with the transport network. To facilitate the optional re-transmission of second data units, the segmentation module can also buffer second data units. As an example, if five first data units have been segmented into twenty second data units and five extra second data units, the segmentation module can buffer the last three sets of second data units corresponding to the last three first data units encoded. Thus, twelve second data units and three extra second data units would be buffered by the segmentation module.

Figure 4:
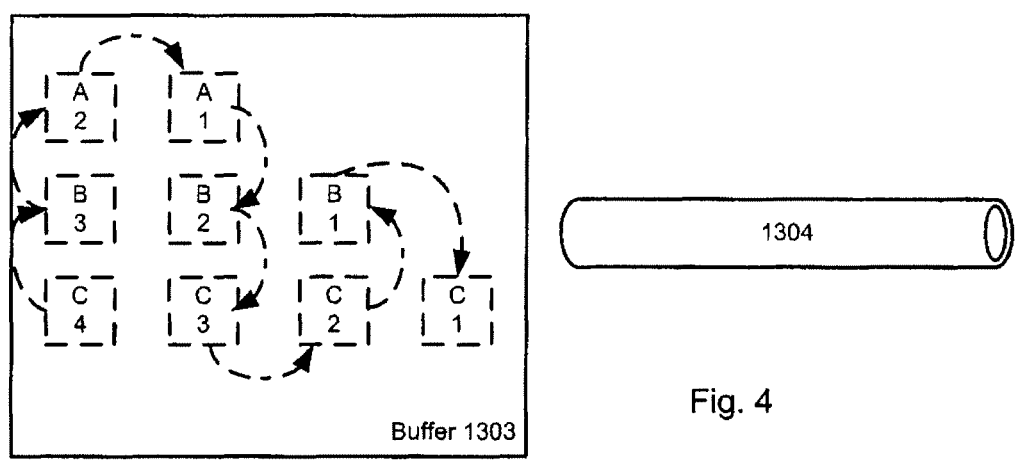
FIG. 4 shows an example of burst mode according to an embodiment of the present invention.
Figure 5:
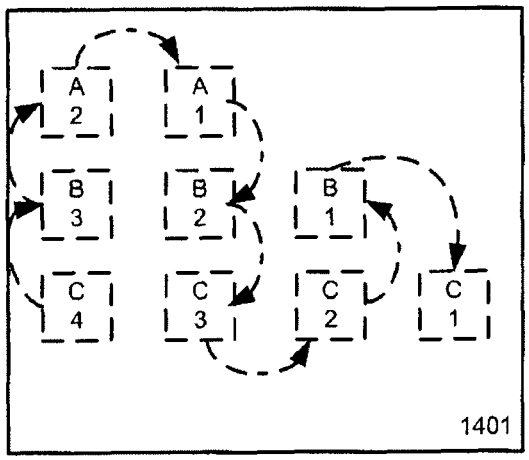
FIG. 5 shows an example of multi-level burst mode according to an embodiment of the present invention.
Figure 5:
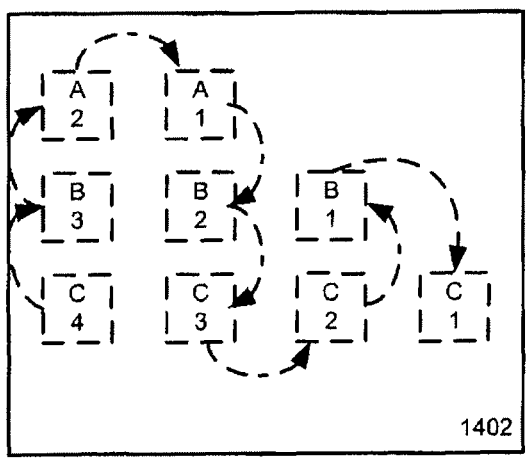
Figure 5:
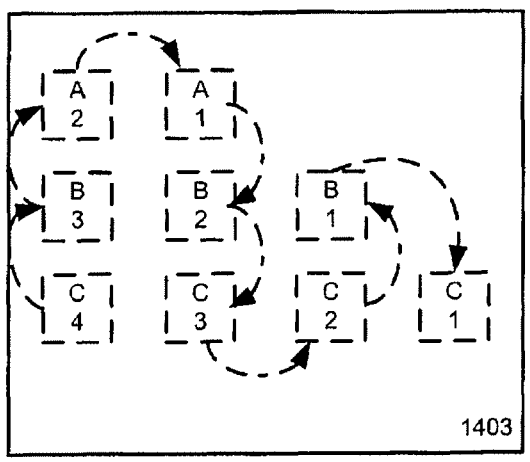
Figure 5:
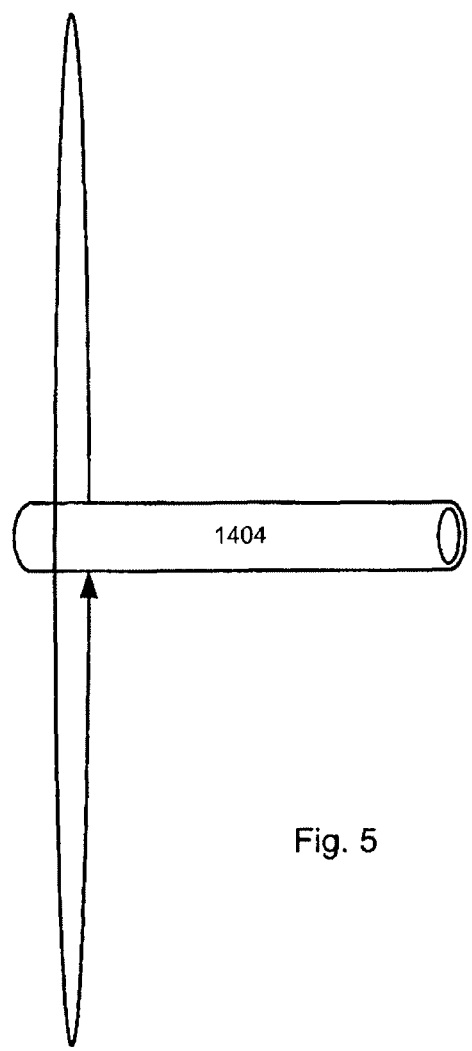

The segmentation module can also be configured to transmit second data units in an interleaved manner, to spread the risk of losing multiple second data units across different segmented first data units. Thus, instead of sequentially sending groups of second data units such that each group corresponds to a single first data unit, second data units from different first data units can be interleaved with one another. FIG. 4 illustrates an example of the interleaving mode. In this example, it is assumed that first data units A, B, and C are respectively segmented into second data units A1, A2; 61, B2, B3; C1, C2, C3 and C4. Second data units A2, B3 and C4 are extra second data units. Instead of sending these second data units grouped according to their respective first data units, they can be interleaved by groups of k first data units. In the example of FIG. 4, k=3. The encoder stores the second data units corresponding to k first data units into a buffer 1303. Alternatively, the encoder stores a number of packets that arrive during a predetermined time period or until a packet with time sensitive information is detected (e.g. via deep packet inspection). To avoid reordering, the set of second data units is aligned to the left such that the last second data of each first data unit is at the tail and will be sent last and the first second data unit of each first data unit is at the head and will be transmitted first. The encoding component transmits on the physical interface 1304 the data units at the head in order of top to bottom or any order that will minimize sending two consecutive second data unit from the same first data unit. In the example of FIG. 4, the second data units could be sent in the following order C1, B1, C2, A1, B2, C3, A2, B3, C4. Sending all the extra second data units last can minimize delay. The interleaving can also be done randomly. The group of data units to interleave can include all the second data units transmitted from the interface or the interleaving group can include second data units of the same application (e.g. same channels of a video conference), the same destination or a preconfigured grouping. In FIG. 5, another level of interleaving can be achieved, by interleaving the second data units of different interleaved groups 1401, 1402, 1403 of interleaved second data units. By such interleaving, the impact of any large loss of data units can be minimized, and, depending on the coding and strategy employed, this type of loss may be recoverable.

Figure 6:
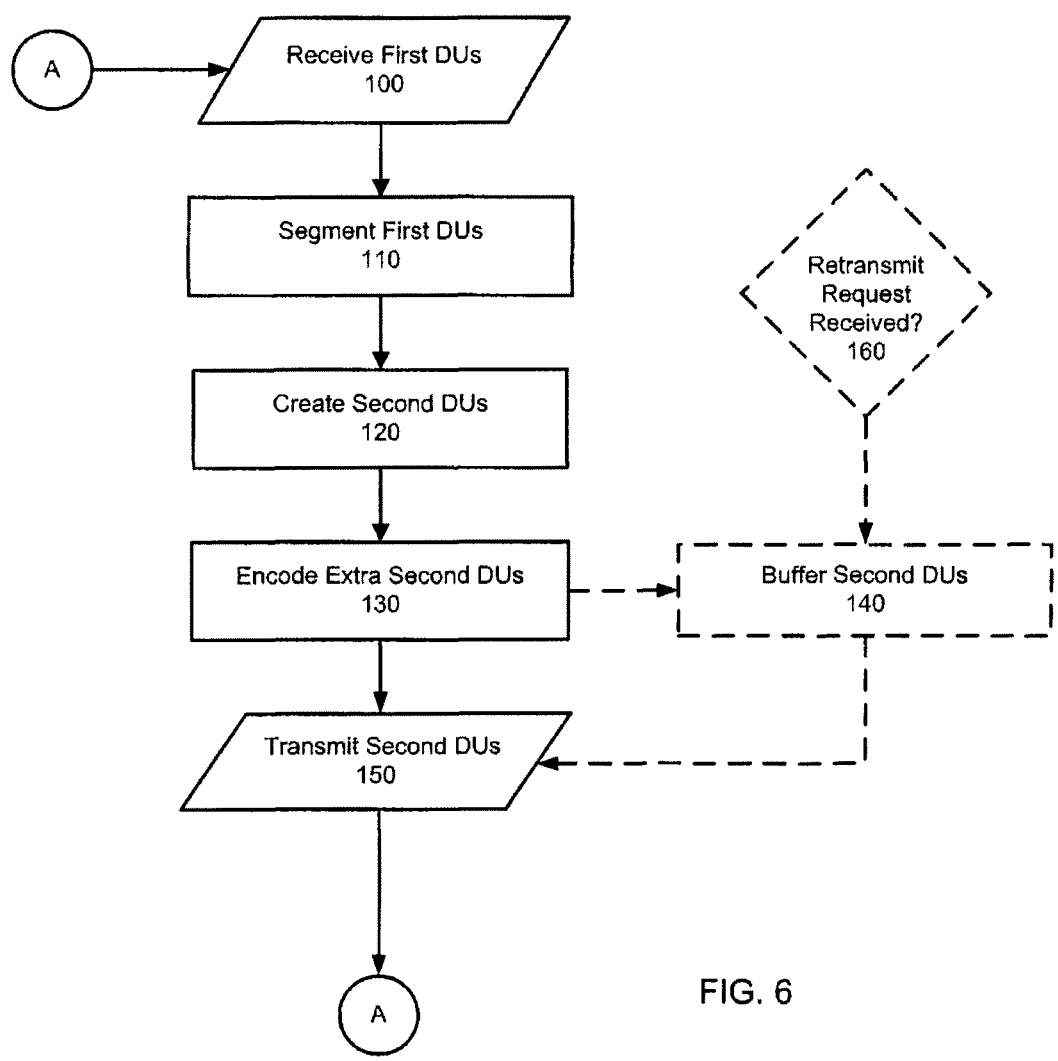
FIG. 6 is a flowchart illustrating the steps executed when first data units are received and transformed into second data units for transmission to the transport network.

An exemplary method according to the present invention, as implemented in one of encoding components 40 and 50, is shown in FIG. 6. The process begins, with step 100, by receiving a first data unit from the source endpoint. After being received, the first data unit is then divided or segmented (step 110) and the segments are packaged into second data units (step 120). Once the second data units are created, the extra or redundant second data units are encoded and created (step 130). The second data units can then be optionally buffered (step 140) and transmitted to the transport network (step 150). The method then returns to step 100 via connector A. If re-transmission is enabled, an optional check for a re-transmission request can be made (step 160) asynchronously. If such a request is received, then the decision flow returns to step 150, and the requested second data units, previously buffered in optional step 140, can be transmitted.

Figure 7:
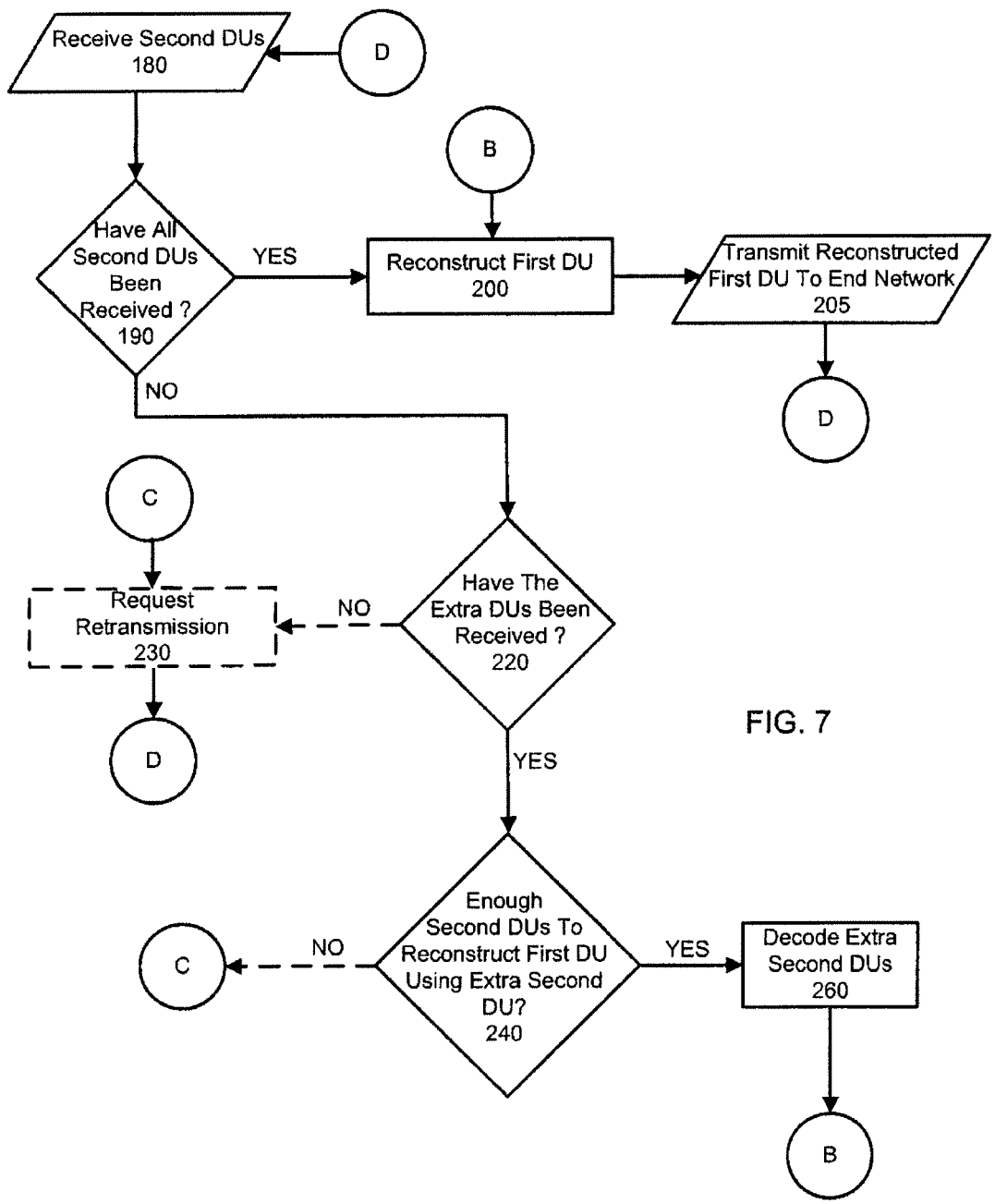
FIG. 7 is a flowchart illustrating the steps executed when second data units are received from the transport network and transformed into first data units for transmission to an end network.

FIG. 7 shows an exemplary embodiment of steps executed by an encoding component receiving second data units from the transport network. The process begins at step 180 as the server receives second data units from the transport network. Decision 190 then determines if all the second data units have been received to reconstruct the first data unit from which the second data units were derived. The encoding component receiving the second data units determines that a second data unit is lost if it has not been received after a predetermined amount of time and/or if a predetermined number of second data units with higher sequence numbers is received. Another technique to determine if a second data unit is lost is to use a ring buffer to keep track of the sequence number of the missing second data unit while waiting for it to arrive. When the buffer cycles back over a second data unit that has still not been received, then that second data unit is deemed lost. If all the second data units have been received, then the original first data unit is recreated at step 200. Once the first data unit have been recreated, the recreated data unit is transmitted to the destination endpoint (step 205) and the control flow moves back to step 180 by way of connector D.

Returning to decision 190, if not all the second data units have been received, then a decision is made to determine if extra second data units have been received (step 220). If no extra second data units have been received, re-transmission can be optionally requested (step 230). After the optional re-transmission request, the control flow returns to step 180 by way of connector D. If extra second data units have been received, decision 240 determines if sufficient extra second data units and second data units have been received to reconstruct the original first data unit. If an insufficient number have been received, the original packet can be dropped, or, optionally, the control flow can return, as indicated by connector C, to step 230: requesting a re-transmission. If a sufficient number of second data units and extra second data units have been received, then the extra second data units can be used to recreate or reconstruct the missing second data units (step 260). Connector B then returns the control flow to step 200.

Figure 8:
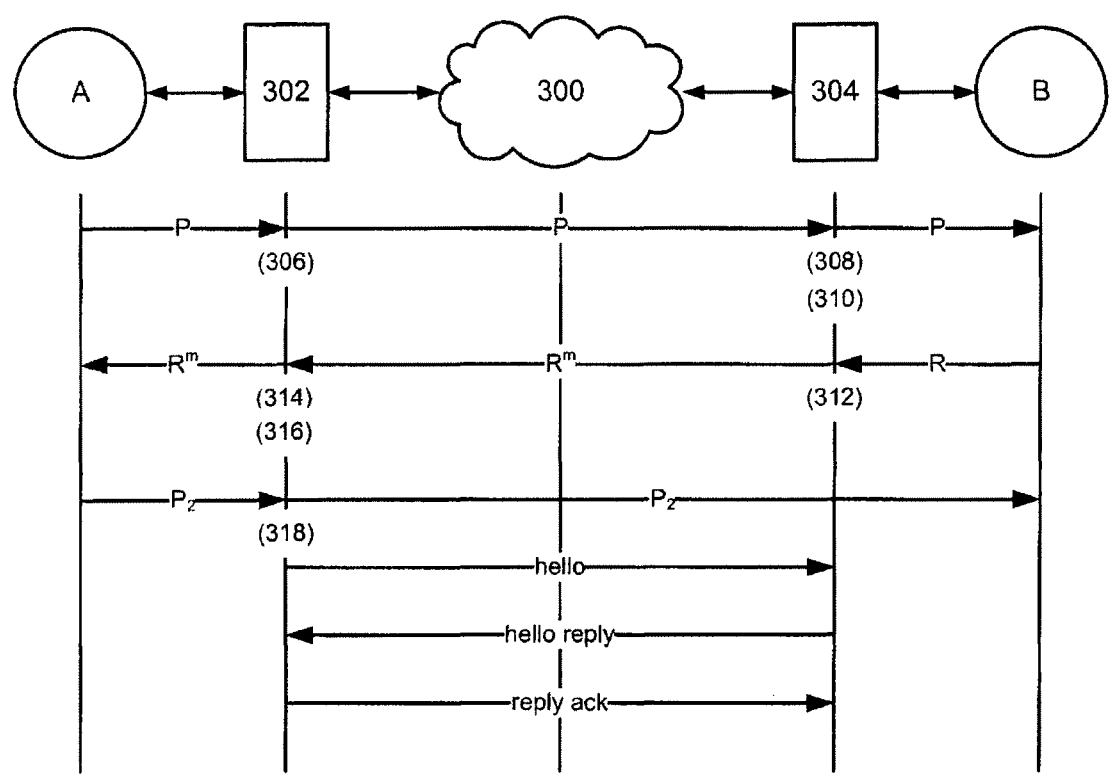
FIG. 8 illustrates an exemplary system and a connection negotiation protocol according to an embodiment of the present Invention.

Some specific examples of implementation will aid in understanding the operation of the present system and method. FIG. 8 shows an exemplary system having endpoints A and B. Endpoint A communicates with a network 300, such as the Internet, through an encoding component 302. Endpoint B is also in communication with the network 300 through an encoding component 304. Encoding components 302 and 304 Include the interfaces, segmentation and reassembly modules described in relation to FIGS. 2 and 3, and can be implemented wholly in software or can be implemented as pre-programmed hardware units, other related software, or as a combination of hardware and software components. An Ethernet, or other suitable connection, can be used to connect each endpoint to its respective encoding component.

For the purposes of this example, it is assumed that a bidirectional communication is occurring between endpoints A and B, and that endpoint A initiates the communication. The present communication protocol is invisible to both endpoints A and B; all functionality resides in the encoding components 302 and 304. To set up a session between endpoints A and B, and to determine if both endpoints are associated with encoding components to permit communication in accordance with the present protocol, the connection negotiation protocol illustrated in FIG. 8 can be used. Endpoint A sends a packet P destined to endpoint B. The packet P and its destination are detected or noticed (306) by encoding component 302, and encoding component 302 stores information uniquely identifying the communication session. Packet P is also detected or noticed (308) by encoding component 304. Encoding component 304 stores information uniquely identifying the communication session (310) related to the packet and sends the packet to endpoint B. When endpoint B sends a reply packet R to endpoint A, the reply packet R is intercepted by encoding component 304, matched with the previously stored information identifying the communication session and marked (312). The information uniquely identifying the communication session can be, for example, the source IP address, the destination IP address, the protocol contained within the IP packet (e.g. UDP or TCP), and the source and destination ports. For Ethernet frames, the VLAN ID can also be used.

The marked packet $R^m$ is used to signal to encoding component 302 that encoding component 304 is capable of receiving and sending packets segmented and encoded according to the present invention. Marking the packet can consist of, for example, setting an option in the IP header of the packet, and/or setting the IP Identification field to a known value. Routers and other devices in the public network 300 may leave the IP identification field unchanged during transmission. Other suitable marking or signaling schemes, such as setting the IP address flag in the timestamp, can be used, provided that they are preferably non-destructive, and non-disruptive to devices that are not capable of communication in accordance with the present protocol.

Encoding component 304 then forwards the marked packet $R^m$ to endpoint A, via the public network 300. The marked packet $R^m$ is detected by encoding component 302, which updates the previously stored information identifying the communication session (316), and sends the packet to endpoint A. The encoding component 302 can optionally remove the mark prior to forwarding the packet to endpoint A. When endpoint A sends another packet $P_2$ destined to endpoint B, encoding component 302 matches (318) the packet $P_2$ with the previously stored information identifying the communication session. Recognizing that endpoint B is provided with an encoding component enabled to communicate in accordance with the present protocol, encoding component 302 sends a "hello" message in addition to forwarding the packet $P_2$.

On receipt of the "hello" message from encoding component 302, encoding component 304 replies with a "hello" reply. Encoding component 302 then sends a reply acknowledgment ("reply ack") to encoding component 304, and begins to segment and encode data packets destined for endpoint B using the present protocol. When component 304 receives the reply acknowledgment from component 302, it also begins to segment and encode data packets destined for endpoint A to provide the second data units previously described. The encoded channel between encoding component 302 and 304 is thus successfully automatically detected and negotiated. The encoded channel can be used to carry both data and control information. Once an encoded channel has been negotiated between two encoding components enabled to use the present protocol, segmented and/or encoded messages can now be sent and received.

Encoding component 304 optionally maintains a table of the different types of markings that are possible. If the marked packet $R^m$ is not detected by the encoding component 302, either because it does not recognize the mark or because a router or other device in the path removed the mark, then no "hello" reply will be sent back to encoding component 304. After some predetermined delay, the encoding component 304 will mark another packet $R^{m2}$ with a different type of mark from the table of the different types of markings. The encoding component can continue to change the mark until encoding component 302 sends the "hello" message to acknowledge receipt of the mark. Encoding component 304 can keep track of which mark was successful to reach another encoding component and use that mark first when it tries to reach that encoding component again in the future. After all the types of mark have been unsuccessfully tried to establish a channel, the encoding component 304 can indicate to a network management system or to an interface that a given encoding component 302 is not capable of understanding the mark or is not present in the network. Statistics can be gathered by the encoding component 304 or an external system on how often the other encoding component 302 would have been part of an encoded channel to prioritize the installation of more encoding software.

The encoded channel remains active until a predetermined timeout period has elapsed during which the encoding components fail to receive any further packets. Both sides then tear down the encoded channel. Since the timers at both ends of the communication channel are not synchronized, an endpoint can enter a "tear down" state after the predetermined timeout period. During the "tear down" state, the incoming packets continue to be decoded, but the outgoing packets are no longer encoded. The "tear down" state is active for a predetermined period, or until no encoded packets are received. The endpoints can send "keep alive" messages to keep the channel alive while there is no traffic. After a predetermined period where no traffic is sent, the keep alive can be stopped and the channel will be tore down after a predetermined timeout period. Alternatively, one of the endpoints can be designated as the master endpoint (either endpoint A or endpoint B), and can explicitly tear down the channel by sending a tear down message. Upon receipt of the tear down notification, the non-master endpoint stops to decode incoming packets from the master endpoint and stops encoding packets destined to the master endpoint. Other methods for negotiating the encoded channel between two endpoints are also contemplated. For example, the encoded channel can be negotiated through a pre-existing control channel between the endpoints to the communication.

It should be noted that all communication between the endpoints and the components 302 and 304 occurs over the established or existing communication channel. The channel can implement known communication protocols, such as Universal Datagram Protocol (UDP) and Transmission Control Protocol (TCP), both over IP. If the connection is a UDP connection, messages according to the present invention are inserted directly into the UDP data payload.

If sending data over an existing TCP connection, the original TCP header can be appended to each segment, with the sequence numbers modified. Thus, the source port and destination ports remain the same. The first segment is given the sequence number of the original packet, but subsequent segments are provided with new sequence numbers. In a presently preferred embodiment, an encoded or extra segment re-uses a sequence number of one of its related segments. This permits the extra segment to pass through firewalls in the same manner as would a re-transmitted packet. The data offset and checksum are modified in each segment and the flags, or control bits, are modified for all but the initial segment. For non-segmented messages (i.e. control messages), the remaining message bytes immediately follow the modified TCP header. For segmented messages, a segment payload follows the modified TCP header to provide, for example, identifying information, such as a serial number, to identify a segment and its relation to other segments, and to enable reassembly of the original packet. The data payload of the segment then follows.

As will be appreciated, a packet marked or created as described above will pass unchallenged through firewalls and Network Address Translation (NAT) translators. Effectively, the encoded channel establishes a control channel between the encoding components 302 and 304, and packets can pass from either end without being recognized or challenged by any intermediate component, such as a firewall or NAT.

Figure 9:
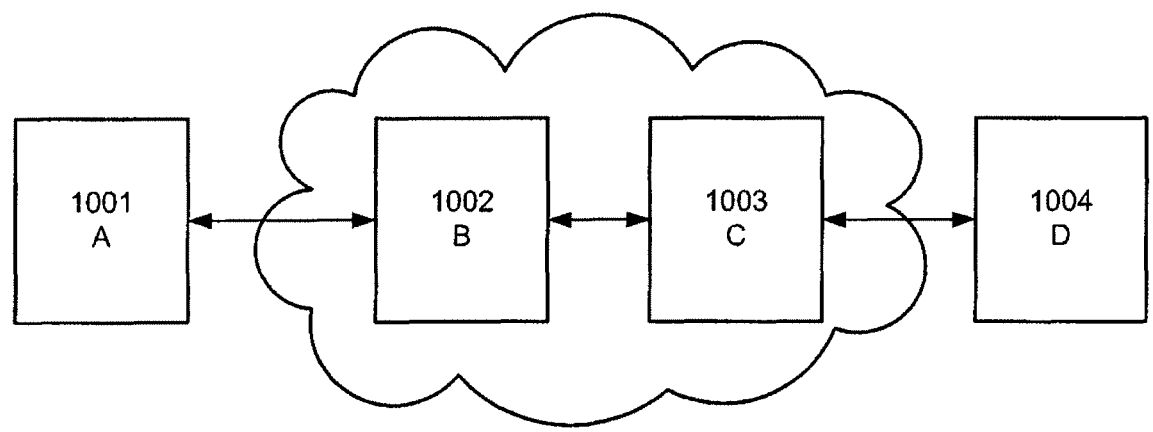
FIG. 9 shows an example network with multiple encoding components according to an embodiment of the present invention.

Referring now to FIG. 9, multiple encoding components 1001, 1002, 1003, 1004 are present in a path. In one embodiment of the invention, the encoding is only performed in the inner most path between encoding components 1002 and encoding component 1003. Since encoding component 1001 is not aware of the presence of the other encoding components, which have precedence, it marks the packet to establish a channel as described above. The encoding component 1002, which is configured to have precedence, removes the information and establishes an encoding session to encoding component 1003. Encoding component 1003 is configured to terminate the encoding session and perform the decoding as described above. The encoded channel will be active between the inner encoding components 1002, 1003. Encoding components can be configured to take precedence such that specific parts or paths of the network are always encoded.

Encoding component B 1002 and encoding component C 1003 can be configured to ignore the marks incoming from specific physical ports and to carry the mark transparently, in this case, the encoding is present in the entire path between encoding component A 1001 and D 1004. The encoding components can also learn topology of the other encoding components in the network and, based on network policy, ignore or react to a mark arriving on a specific physical port.

Figure 10:
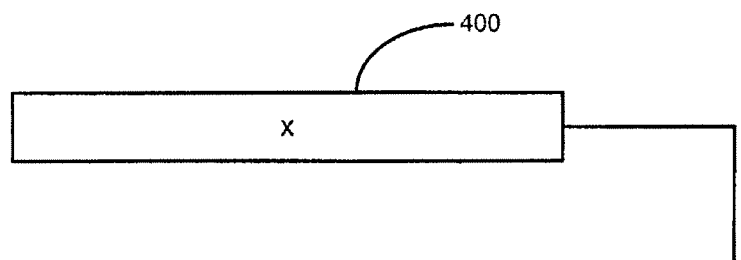
FIG. 10 illustrates a generic segmentation and encoding of a packet according to the present invention.

Segmentation and encoding of a packet according to an embodiment of the present invention will now be described with reference to FIG. 10. To simplify the discussion, headers have been omitted from the original packet and the segmented packets. An original data payload 400 is received at an encoding component according to the present Invention. The original data payload has x bytes, and is segmented into n segments 402. Where n is chosen as an integer factor of x, each of the n segments will have x/n bytes, as shown. In addition, m additional segments are created. In the example shown in FIG. 10, m=1 and the additional or extra packet 404 is a parity segment created by applying an XOR function to one of the n segments. The encoding component can take into account the size of the packet and can increase n automatically to avoid transmitting a second data unit of a size that would exceed the Maximum Transfer Unit (MTU) of the network when the encoding header is added to the second data unit. This capability can also be useful for splitting jumbo frames prior to entering a network that cannot handle them.

Figure 11:
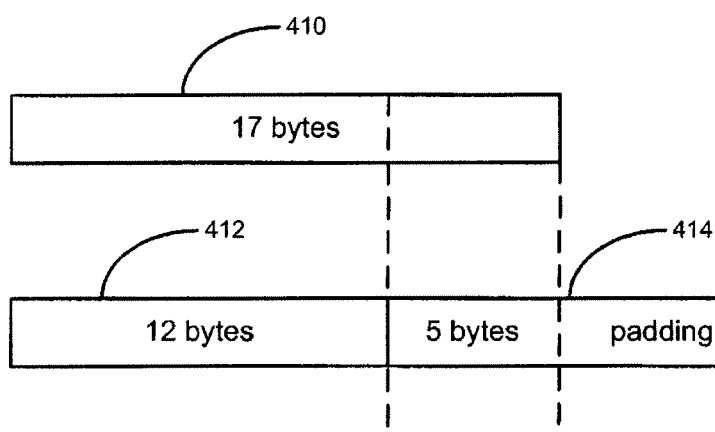
FIG. 11 shows an exemplary segmentation and encoding of a packet according to an embodiment of the present invention.

It may not always be possible or desirable to divide the original data payload 400 into even segments. For example, it may be necessary to pad the last segment to ensure all segments are of equal length where n is not a factor of x. For example, if x=17 and n=2, the nearest integer value to x/n is 9. Segment sizes that are factors of 4 or 8 are generally preferred, thus the segment size in this case is chosen to be the next factor of 4 greater than, or equal to x/n (e.g. 12 bytes). As shown in FIG. 11, the original 17 byte data payload 410 is segmented into two 12 byte segment payloads 412 and 414. Segment payload 412 contains the first 12 bytes of the original data payload 410, and segment payload 414 contains the remaining 5 bytes from the original data payload 410 optionally padded out to 12 bytes. A further extra segment 416, which is a parity segment of segment 412, forms the final segment in the sequence. It should be noted that all the segments related to a single original packet or frame have the same serial number to permit their identification and reassembly at the receiving end.

The encoding rate is determined by both n and m. The encoding rate can be set to predetermined values (e.g. n=2, m=1 as shown in FIG. 11), or can be adjusted based on observed and/or reported network performance for all encoded channels terminating at an encoding component associated with a given endpoint.

Figure 12:
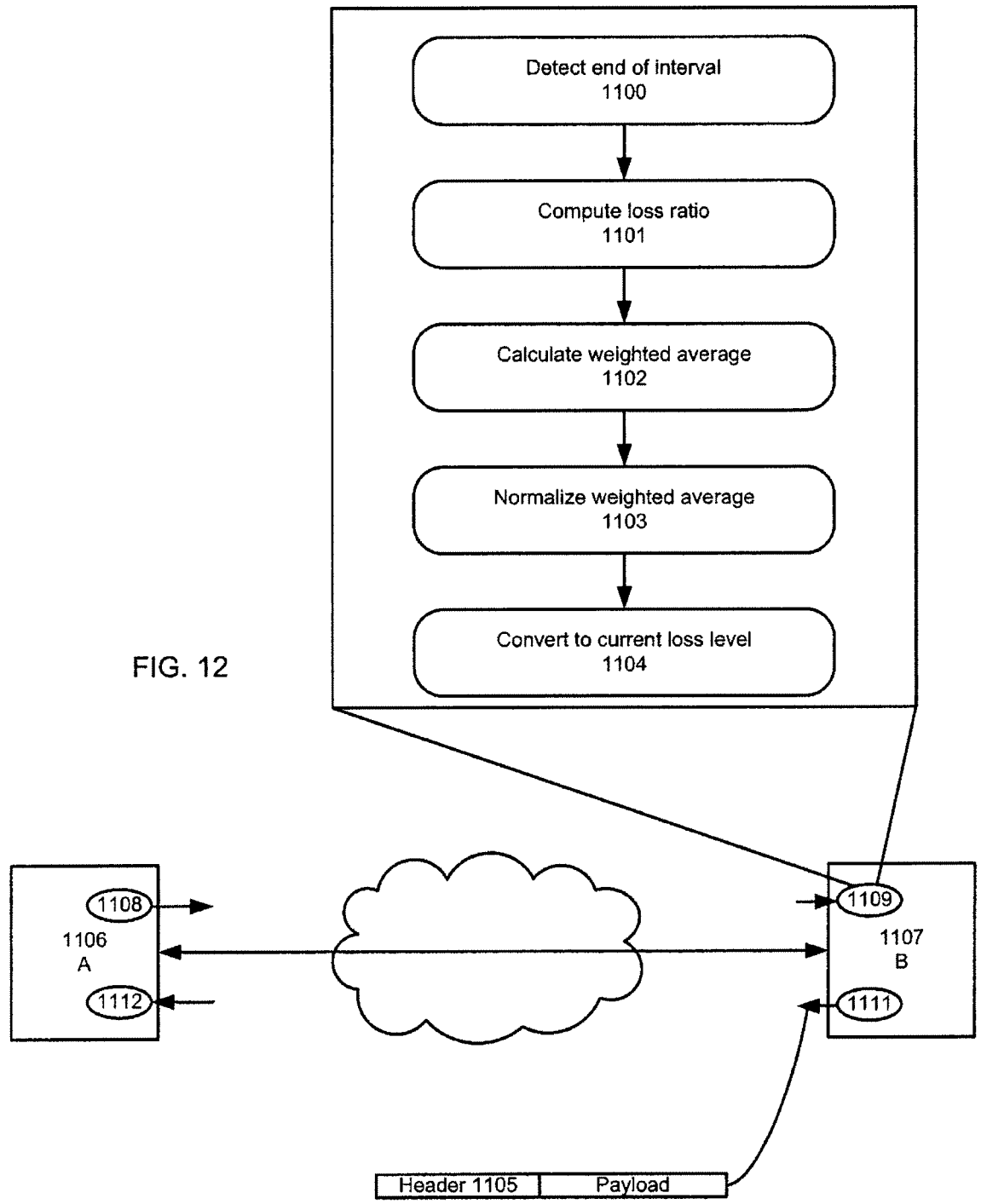
FIG. 12 shows a first example algorithm to evaluate loss according to an embodiment of the present invention.

Referring to FIG. 12. The determination of the loss level is described in relation to the encoded channel between encoding component A 1106 and encoding component B 1107, more specifically looking at the channel in the direction from encoding component A to encoding component B 1110. Under a "no loss" condition, the encoding can be set to n=1 and m=0 to avoid using extra bandwidth in the network when it is not necessary. The receiving process 1109 of the encoding component B 1107 counts the number of packets received $P_x$ and the number of packets lost $LP_x$ over an interval period of size of W units of time (for example W=8 seconds) 1100. Alternatively, $LP_x$ can represent the number of retransmission requests, such that the successfully recovered loss is not counted as part of the loss ratio. The loss ratio $L_x$ is calculated 1101 using for example the following ratio:

$$L_x = LP_x/(P_x + LP_x) \quad (1)$$

To avoid reacting to random events, an average loss 1102 can be computed over the last z loss measurements. In order to take into account the most recent network status, a weighted average can be performed to weight the most recent measurements as per the following equation:

$$WL_x = \frac{\sum_{i=(x-z)\ldots x}(L_i \cdot w_i)}{\sum_{i=1\ldots z} w_i} \quad (2)$$

where $WL_x$ represents the weighted average of the most recent loss measurements for interval x. The weights $w_i$ are such that $w_i < w_j$ for $i < j <= x$.

To avoid keeping track of many loss measurements, the previous weighted loss can also be used to evaluate the new weighted loss:

$$WL_x = \frac{(WL_{x-1} \cdot w_{old}) + (L_x \cdot w_{new})}{w_{new} + w_{old}} \quad (3)$$

where $w_{old}$ and $w_{new}$ are weights that are set in general such that $w_{old} < w_{new}$.

Optionally the weighted loss ratio can be normalized 1103 to simplify the lookup using integers only. The normalized loss $NL_x$ can be computed using the following equation:

$$NL_x = \frac{N \cdot WL_x}{P_x} \quad (4)$$

where N is the normalization factor (e.g. N=10000).

$NL_x$ is then used to index a loss level table 1104 to extract the current loss level. An example of a loss level table is shown below, providing 8 loss levels, where INT_max represents the largest integer or a large value (e.g. 10000).

| $NL_x$ min | $NL_x$ max | Current Loss level |
|---|---|---|
| 0 | 0 | 0 |
| 1 | 75 | 1 |
| 76 | 145 | 2 |
| 146 | 185 | 3 |
| 186 | 210 | 4 |
| 211 | 260 | 5 |
| 261 | 370 | 6 |
| 371 | INT_max | 7 |

The sending process 1111 of encoding component B 1107 then inserts the current loss level 1105 in the header of each second data unit sent for that session to encoding component A 1106. The receiving process 1112 in encoding component A 1106 reads the current loss level from the received packets. It then indexes a new parameter table with the current loss level to obtain the value of n and Max_n. Max_n represents the largest value that n should be set given the current loss level. Multiple new parameter tables can be used to achieve different loss objectives based on the application requirements and acceptable overhead. An example of such new parameter table using 8 loss levels is shown below.

| Loss level | Max_n | m |
|---|---|---|
| 0 | Int_max | 0 |
| 1 | Int_max | 1 |
| 2 | Int_max | 1 |
| 3 | 3 | 1 |
| 4 | 2 | 1 |
| 5 | 2 | 1 |
| 6 | 1 | 1 |
| 7 | 1 | 1 |

Where INT_max represents the largest integer (infinity). Before the sending process 1108 of encoding component A 1106 encodes a packet of size s, it indexes a preconfigured packet size table with s, to obtain rec_n, which represents the recommended value of m given the packet size. An example packet size table is show below:

| Packet size (bytes) | Rec_n |
|---|---|
| <88 | 1 |
| 89 to 264 | 2 |
| 265 to 528 | 3 |
| >528 | 4 |

Using this table, a packet with s<88 bytes returns Rec_n=1. If s>528 bytes, then Rec_n=4. The value of n used to encode the packet is then determined as n=min(Rec_n, Max_n).

In another embodiment of the invention, the receiving process 1109 calculates the weighted loss ratio WLx as per equation (2) or (3) above. It can optionally normalize to compute NLx as per equation (4). The exact loss value (WLx or NLx) is sent at regular intervals (e.g. every second) to the receiving process 1112 into a control message that is inserted in the encoded channel for the session. The receiving process 1112 extracts the exact loss value from the control messages. The sending encoding component 1108 uses the exact loss value to index a new parameter table to obtain Max_n and m.

| $NL_x$ min | $NL_x$ max | Max_n | m |
|---|---|---|---|
| 0 | 0 | Int_max | 0 |
| 1 | 75 | Int_max | 1 |
| 76 | 145 | Int_max | 1 |
| 146 | 185 | 3 | 1 |
| 186 | 210 | 2 | 1 |
| 211 | 260 | 2 | 1 |
| 261 | 370 | 1 | 1 |
| 371 | 10000 | 1 | 1 |

The value of n is derived as n=min(Rec_n, Max_n). Multiple new parameter tables can be configured to reflect different loss objectives and the sending process 1108 uses the appropriate table based on the loss objectives of the application. Sending the actual loss rate, instead of the current loss level, allows to only configure the parameter tables at the encoding side thus simplifying the configurations.

Figure 13:
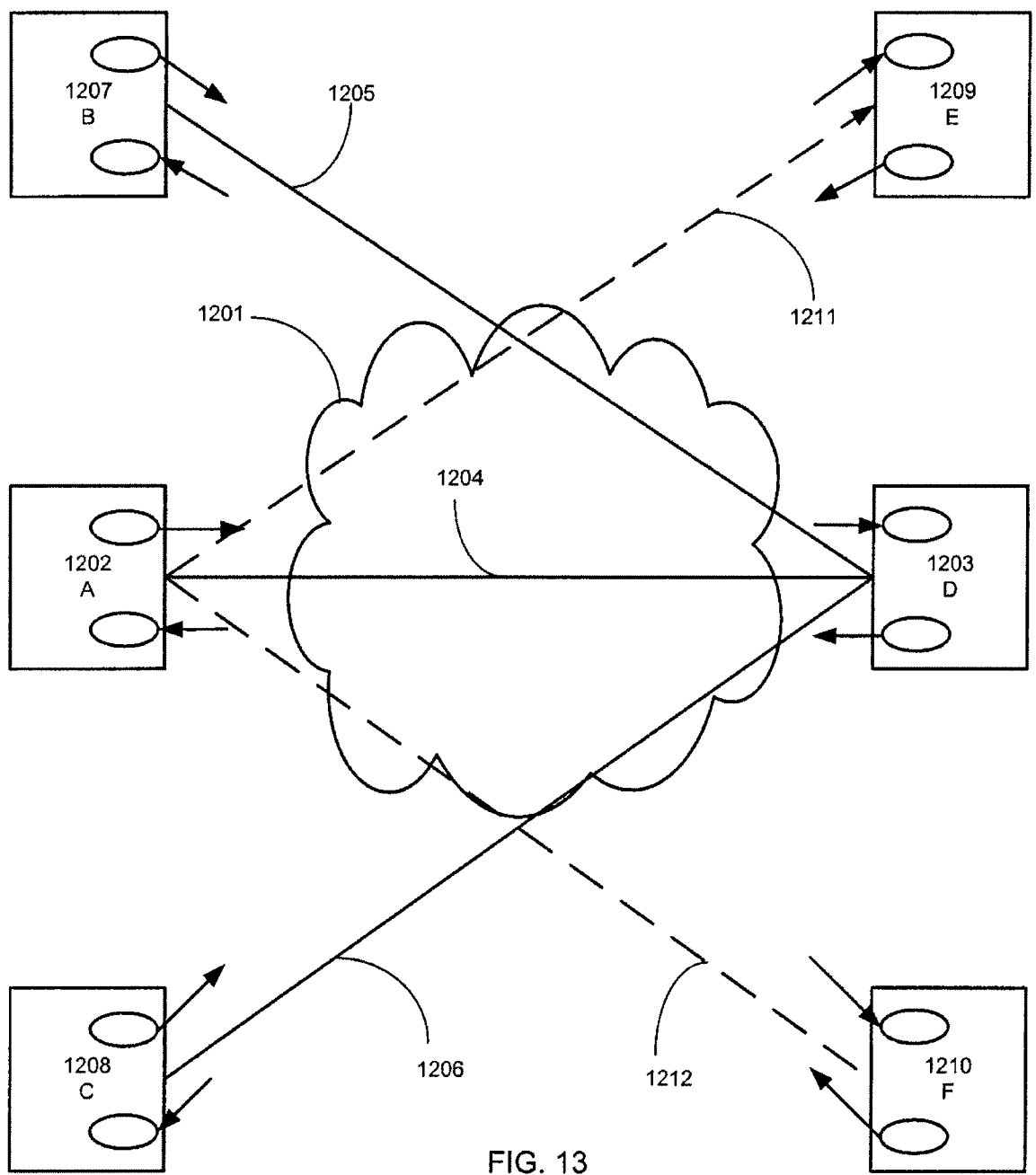
FIG. 13 shows an example embodiment considering average loss according to an embodiment of the present invention.

An example of another embodiment of the invention is shown in FIG. 13. In this embodiment, the encoding components estimate where the loss is occurring in the network 1201, that can comprise for example of a combination of the Internet, a private network or virtual private network, to determine whether to change the encoding parameters. The encoded session 1204 between encoding component A 1202 and encoding component D 1203 is used to describe the embodiment, more specifically looking at the flow in the direction from A 1202 to D 1203.

As previously described, receiving process of encoding component D 1203, computes the loss level of each encoded flows it receives. In this example, it computes loss levels of 3 flows 1204, 1205 and 1206 originating from encoding components A 1202, B 1207 and C 1208 respectively. In addition to returning the loss level measured for the flow, the receiving encoding component computes the average of the weighted loss ratio $AL_x$ from the f flows that are sending to it over an interval period x.

The interval period can be the same as the interval period used for calculating the loss ratio for a single flow. The average loss ratio can be calculated, for example, as:

$$AL_x = \frac{\sum_{i=1\ldots f} WL_i}{f} \quad (5)$$

where $WL_i$ can be calculated as per equation (2) or (3) above. The $AL_x$ can then be normalized as per equation (4) above to create a normalized average loss ratio, $NAL_x$. The $NAL_x$ is then indexed in a loss level table to obtain an average loss level at the far end ($ALFE_x$). The loss level table can be the same as above or preconfigured with different numbers. The $ALFN_x$ is added to the packet header of the second data units transmitted by the sending process of encoding component D 1203 to the respective encoding components 1202, 1207, 1208 along with the per flow current loss level computed as above.

If the aggregate information is included in the packet header, the sending encoding component 1202, 1207, 1208 can use the information to decide whether to change its encoding level. The receiving process of encoding component A 1202 also calculates the average loss at near end ($ALNE_x$) which is the average of the current loss level received in the return channel from the g encoded sessions 1211, 1212, 1204 active during measurement period x, $$ALNE_x = \frac{\sum_{i=1\ldots g} CurrentLossLevel_i}{g} \quad (6)$$

In the example of FIG. 12, the $ALNE_x$ calculated at encoding component A represents the average of the current loss level received from encoding component D 1203, encoding component E 1209 and encoding component F 1210.

If the difference between the current loss level for the session and the ALFEx is below a predetermined threshold, the current loss level Is used to set m and n, as per the description above. In this case, it is assumed unlikely that the sessions are congesting the upstream network since the current loss level is better or a little worst than the computed ALFEx.

If the difference between the current loss level and the $ALFE_x$ is greater or equal to a predetermined threshold AND the current loss level minus the $ALNE_x$ is greater of equal to a predetermined threshold, then the current loss level is ignored and m and n are set according to the packet size table only to minimize bandwidth usage by choosing the most bandwidth efficient encoding method for the given packet. The predetermined thresholds could be different and set according to network policies and topology.

If the loss level increases beyond a predetermined interleaving threshold, the sending encoding component can switch to the interleaving mode to attempt to further reduce the loss. When the loss level is below another threshold the interleaving mode can be turned off to reduce the delay. Alternatively, a count of how often a predetermined number of second data unit were lost in the same packet is kept and when such count exceed a predetermined threshold, the encoding component switches to the interleaving mode. When the count is below a predetermined threshold for a predetermined amount of time, the encoding component returns to the non-interleaving mode to reduce delay.

The examples described above generally relate to bidirectional communications between endpoints, where negotiation of the encoded channel is feasible and desirable. However, the present invention can also be used in substantially unidirectional, or streaming, applications to accelerate their performance, and in other applications where negotiating the connection between the encoding components is impractical or otherwise undesirable. In such applications, no negotiation is required between the encoding components associated with each endpoint. The encoded channel is established by recognizing call signaling messages, and subsequent deep packet analysis permits messages related to the communication session to be recognized.

For example, the encoding/decoding components of the present invention can be used to take advantage of the stateful nature of Real-Time Streaming Protocol (RTSP) to set up and monitor a connection for streaming. The default port for RTSP commands is port 554. Therefore, the encoding components of the present invention can analyze packet headers to determine if they are destined to, or originate from, the RTSP default port, and thereby identify RTSP packets. If a RTSP message is detected, the message can be parsed to determine if it contains a SETUP request, a SETUP response, a TEARDOWN request, or a general RTSP response. A SETUP request from a user contains the media stream URL and a local port for receiving RTP data (audio or video). The RTSP server reply confirms the chosen parameters, and provides the server's chosen ports. By parsing the reply from the RTSP server, the encoding components can determine the RTSP session identification assigned to the data stream, the RTSP sequence number for the message, and the RTP ports that have been allocated for the session by the user terminal and the RTSP server. In this way, an encoded channel for streaming can be set up between the encoding components. Subsequent data units between the client and server can then be analyzed, such as by deep packet analysis. If the ports match those set in the SETUP reply, the message can be intercepted for segmentation and encoding, or decoding and reassembly, as described above, without any negotiation to set up the encoded channel.

Similarly, for H.323, the encoding components can analyze packets for messages indicating an H.323 call is being set up. For example, the encoding components can detect and do a deep packet analysis on H.225/Q.931 call setup messages and/or H.245 negotiation and path setup messages to identify called and caller data ports that will be used for the associated H.323 session. An encoded channel according to the present protocol can then be set up to intercept and encode the data flow as described above.

Within the context on a given session, the different streams can be treated with different loss objectives. DPI can be used to detect the type of application and set the loss objectives according to a configured network policy for that type of application. Ultimately each packet can have its own loss objective based on information provided in the header that identifies the level of protection required (e.g. SVC—scalable video codec).

In another embodiment of the invention, the increase in the value of n is performed gradually to avoid a big step in increase of overhead. When a higher value of n is recommended using the table, it is applied to only a subset of the following first data unit. Using this embodiment, only v first data unit out of the next incoming w first data unit use the increased value of n while the other w-v will use the previous lower value for n. The value of v and w can also change if the measured loss ratio continues to increase or as the measured loss ratio approaches the next level.

For example, if the measured loss (weighted or normalized) is 0% then, n=1, m=0 and v=w=1. Therefore all packets are encoded with n=1, m=0. If the measured loss increase to greater than 0% but lower than 0.05%, then n=4, m=1, but v=1 and w=3, such that only one out of 3 packets is encoded with n=4, while the others use the previous encoding level n=1, m=0. When the measured loss exceeds 0.05% but is below 0.1%, then change to v=1 and w=2, such that every second packet is encoded with n=4, while the others use the previous encoding level n=1, m=0. When the measured loss exceeds 0.1% but is below or equal to 0.2%, then use v=1 and w=1, such that every packet is encoded with n=4. Different values of v and w can be configured to smooth out the overhead increase at different predetermined loss levels. This capability can significantly smooth out the transfer function between different loss ratios.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be implemented in a network having endpoints, such as servers or other computing devices, and associated encoding components. The encoding components, and the described methods, can be implemented in hardware, software or a combination thereof. Those portions that are implemented in software can represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A system for improving quality of data transmission in a network path between a first and a second device comprising:
said first device sending first layer 3 data transmission unit (L3DTU) to a segmenting module coupled to said first device;
said segmenting module segmenting each first L3DTU into a plurality of second L3DTUs and adding at least one extra encoded L3DTUs when the segmenting module determines that the loss performance of the network path is below a pre-determined threshold;
said segmenting module transmitting over said network said second L3DTUs and said extra encoded L3DTUs to a reassembly module coupled to said second device; and
said reassembly module reassembling first L3DTUs from said at least two second L3DTUs and said at least one extra encoded L3DTUs received from said network before sending to said second device.

2. The system of claim 1 wherein said extra encoded L3DTUs are redundant L3DTUs from said second L3DTUs.

3. The system of claim 2 wherein said extra encoded L3DTUs are duplicates from said second L3DTUs.

4. The system of claim 2 wherein said extra encoded L3DTUs are XOR from said second L3DTUs.

5. The system of claim 1 wherein said performance of the network path is measured in packet loss.

6. A method for improving quality of data transmission in a network path between a first and a second device comprising:
   sending, at said first device, first layer 3 data transmission unit (L3DTU) to a segmenting module coupled to said first device;
   segmenting, at said segmenting module, each first data transmission unit (L3DTU) into at least two second L3DTUs and adding at least one extra encoded L3DTUs when the segmenting module determines that the loss performance of the network path is below a pre-determined threshold;
   transmitting, by said segmenting module, said second L3DTUs and said extra encoded L3DTUs to a reassembly module coupled to said second device over said network; and
   reassembling, by said reassembly module, first L3DTUs from said at least two second L3DTUs and said at least one extra encoded L3DTUs received from said network before sending to said second device.

7. The method of claim 6 wherein said extra encoded L3DTUs are redundant L3DTUs from said second L3DTUs.

8. The method of claim 7 wherein said extra encoded L3DTUs are duplicates from said second L3DTUs.

9. The method of claim 7 wherein said extra encoded L3DTUs are XOR from said second L3DTUs.

10. The method of claim 6 wherein said performance of the network path is measured in packet loss.

* * * * *